US006044636A

United States Patent [19]

Minnaert

[11] Patent Number: 6,044,636
[45] Date of Patent: Apr. 4, 2000

[54] CORN HARVESTER

[76] Inventor: Eric Minnaert, R.R. 2, Box 41, Madison, S. Dak. 57042

[21] Appl. No.: 09/149,012

[22] Filed: Sep. 8, 1998

[51] Int. Cl.[7] .......................... A01D 57/00; A01D 43/02; A01D 45/00; B02B 3/00; A01F 12/00

[52] U.S. Cl. ........................ 56/220; 56/364; 56/DIG. 20; 460/33; 460/121; 460/134

[58] Field of Search .............................. 56/220, 364, 226, 56/DIG. 20, 119, 167; 460/33, 88, 121, 134

[56] References Cited

U.S. PATENT DOCUMENTS

| | | | |
|---|---|---|---|
| 1,770,077 | 7/1930 | Kunz | 56/220 |
| 2,669,082 | 2/1954 | Anderson | 56/364 |
| 3,302,378 | 2/1967 | Rasmussen | 56/220 |
| 3,698,166 | 10/1972 | Fisher | 56/220 |
| 3,733,796 | 5/1973 | Wood et al. | 56/220 |
| 4,706,448 | 11/1987 | Gessel et al. | 56/400 |
| 4,751,809 | 6/1988 | Fox et al. | 56/226 |
| 4,981,013 | 1/1991 | Underwood | 56/364 |
| 5,005,346 | 4/1991 | Medernach | 56/312 |
| 5,595,053 | 1/1997 | Jasper et al. | 56/226 |

*Primary Examiner*—Thomas B. Will
*Assistant Examiner*—Meredith C. Petravick

[57] ABSTRACT

A farm implement for harvesting corn (sometimes called maize). The harvester is usable with a farm type combine and is particularly designed to be used in fields that have been planted either by a broadcast method at ground level or from the air, or in clearly spaced rows at spacings which might vary from the usual. The harvester is distinguished by the ear-stripping fingers on a reel at the front of the carrying combine. The fingers strip the ears from the corn stalks in front of the carrying combine and carry them to a delivery auger, which is a standard part of the combine, to be delivered to husking rolls in the combine for husking.

13 Claims, 2 Drawing Sheets

CORN HARVESTER

BACKGROUND

This invention pertains to farm implements and more particularly to a harvester for corn such as is used for animal feed. It is especially designed for harvesting corn which is not planted in rows or is planted in rows spaced differently from the usual.

Until recently corn (sometimes called "maize") has been planted exclusively as a row-crop. As the corn plant has been developed with hybrid seed and other improvements, the use of more closely spaced rows and higher population of plants per unit of area has become common.

At the same time the disadvantage of row-crops has also become more apparent. In earlier days of corn planting the corn was checked in rows spaced at 40-inch intervals. This allowed a cultivator to be run through the rows on perpendicular paths allowing for good mechanical removal of weeds. Later, with the increasing success and efficiency of herbicides, rows could be spaced closer and it was no longer necessary to cultivate with a mechanical cultivator in two directions. Weeds were simply killed chemically. However, the rows still provided water courses or wind paths leading to erosion of topsoil. This was less true of rows that followed or approached following the contours of the land. That expedient at least slowed erosion.

Most recently it has been proposed that corn be planted by broadcast methods with random intervals between plants and no discernable rows. However all harvesting equipment has been adapted to row planting. All corn combines now require that the rows be divided by an extending snout on the corn head of the combine and the corn plant then carried between the stripping fingers of the corn stripping device which removes the ears from the plant. The ears are then carried into husking rolls which remove the husks and finally the grain is removed from the cob.

The use of the row separating snouts makes impractical the use of present machines to harvest random-planted corn or corn planted in very narrow rows. ordinary combines usable for harvesting other row-planted grains are also impractical because of the need for separating the corn ear from the tough stalks. That requirement is not present in most other grain crops which may be planted randomly or in very narrow row spacing.

It should be recognized throughout the description that although the principal benefits may come from use of the invention in a machine with corn planted at random, the machine is also useful if the customary row spacing should change. For example, when farmers changed from 30 inch spacing of rows to a 20 inch spacing, new corn heads for the new spacing were required on practically all of the corn harvesters. If customary spacing were again to be changed, the machines using the present invention would continue to be useful.

By the present invention, applicant has provided a machine capable of and adapted to the removal of the ears of corn from randomly-planted stalks of corn, and delivering that ear to husking and shelling machinery in the combine so that corn may be fully harvested in the same general manner as is row-planted corn.

DESCRIPTION

Briefly this invention comprises an attachment to a corn combine adapted to separate stalks of corn in a randomly planted field or in closely spaced rows and to strip these stalks of any ears on the stalks in order that the ear may be delivered to the husking and shelling mechanism of the combine. Safety devices for protection of the harvesting mechanism are also provided.

As noted above in the section relating to background, randomly planted fields of corn, while not yet common, do have certain advantages. The disadvantage is that no machine has, until the present invention, been devised to harvest the corn efficiently and effectively. The problem is to isolate the stalks of the corn plants and to strip the ears from those stalks. As will be clear from the following description referring to the figures, the present invention is effective for that purpose.

Figure 1:
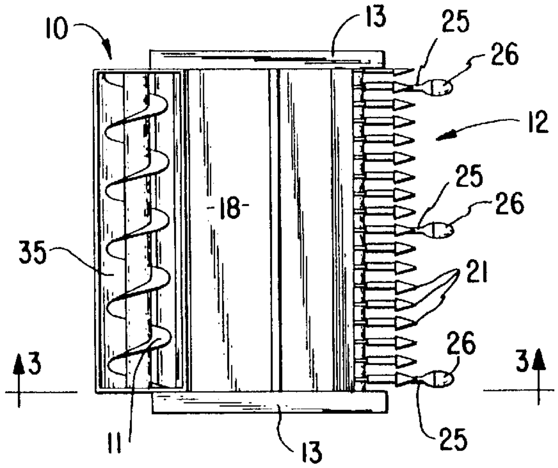
FIG. 1 is a top plan view of the harvester attachment of the invention connected to a basic combine, only a portion of which is shown.
Figure 3:
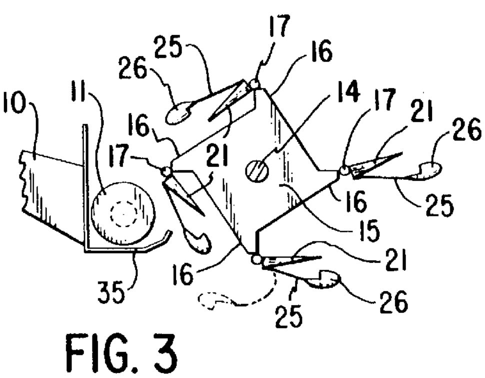
FIG. 3 is a sectional view from line 3—3 of FIG. 1.
Figure 2:
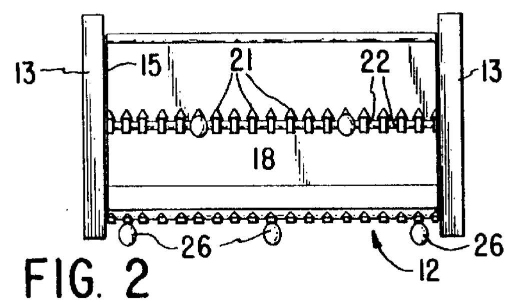
FIG. 2 is a view of the rotor of the harvester attachment.

As best shown in FIGS. 1 and 3, the invention comprises an attachment for the front of a corn combine indicated at 10. The combine includes a delivery auger 11 adapted to receive ears of corn stripped from stalks and to deliver those ears to mechanisms in the combines. The attachment of this invention is effective to strip ears from the stalks.

The attachment comprises essentially a rotor or reel 12 rotatably mounted on end plates 13 which are adapted to be attached to the combine 10. The actual physical attachment is made in a similar manner to the now-common corn head or grain head attachments. It assumes that the same ground sensing and ground clearance devices are in place and operate in the designed manner. The reel 12, includes a central shaft 14 rotatably mounted in the end plate 13 and is driven in conventional manner from the combine. In this relation, the device may have the exact same drive that drives the rotor of a combine for small grain as is well-known in the art.

Formers 15 are permanently attached to the shaft 14 and are carried by that shaft in its rotation. Those formers carry the stalk lifting mechanism and the stripping fingers which strip the ears from the stalks. These formers 15 include lobed fingers having preferably four lobes 16. A carrier shaft 17 is pivotally journalled at the outer end of each lobe. The relative position of each shaft is controlled by a cam mechanism and will be described later.

The reel 12 also includes sheet metal covers 18 extending between the longer flat section of each former 15. These serve to enclose the reel, and as will appear later also assist in the delivery of corn ears to the auger 11.

Figure 4:
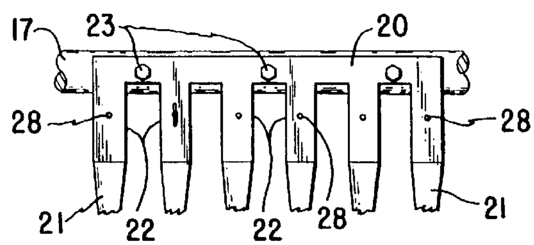
FIG. 4 is a detailed plan view of a portion of a single row of stripping fingers on the rotor and shown to a enlarged scale.
Figure 6:
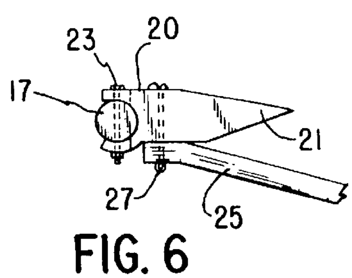
FIG. 6 is a detailed end view of the fingers shown in FIGS. 4 and 5.
Figure 5:
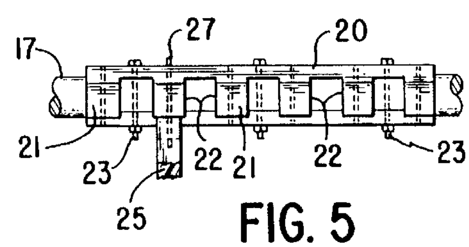
FIG. 5 is a front end view of the fingers shown in FIG. 4.

To each shaft 17 is fastened a series of plates 20, each of which is formed with a group of parallel fingers 21. These plates 20 and fingers 21 are best shown in FIGS. 4–6. The fingers 21 are spaced apart at intervals slightly wider than the diameter of an ordinary corn stalk. Experience suggests a spacing of approximately 1 to 2½ inches to leave a channel of about one inch in breadth between each pair of adjacent fingers 21. Each plate 20 carries a preferred number of six or eight fingers 21 and is fixed to the shaft 17 by bolts 23 or similar removable fasteners. In this way, a limited number of teeth can be replaced should one be broken, and thus, it will not be necessary to replace the teeth on the whole width of the shaft 17.

An optional feature is illustrated in FIGS. 1–6. This feature is both a safety feature and a useful device. It comprises a series of extending arms 25 carrying shoes 26 at their outer end. The arm 25 may be fastened to selected teeth 21 at spaced intervals. The preferred spacing of these sending devices is about one sensor per plate 20. As shown in FIGS. 4 and 6, each arm 25 is fastened to the chosen tooth 21 by use of a split key 27 extending through a hole 28 in the tooth 21. Because each tooth has a hole 28 to which the arm could be fastened, the exact spacing may be done at the option of the user. Applicant suggests that about one arm for each plate would be appropriate.

In order to explain more easily the operating mechanism, it may be better to describe the function of the various parts of the machine at this stage. In use, the attachment is fastened to the front end of a combine generally used for the harvesting of corn. The customary "corn head" is replaced by the device of the present invention, specifically including the reel 12 and its mechanisms. To drive the reel rotatably, any of a group of devices may be used. Belts or chains from the combine might be used by proper expedients including pulleys for the belts or sprockets for the chains. Applicant prefers to use a separate motor powered by electricity or by hydraulic pressure from the systems built into the combine. Such motors are well known in the art and may be directly connected or connected through a gear train to the reel 12 to drive that reel. The motor may also be of a variable or controllable speed.

The reel 12 rotates in a direction such that the fingers 21 extending in front of the combine will be moving upward so as to engage stalks and strip the stalk of its ear or ears. Stalks which are partially lodged may also be picked up by this process and also stripped. Because the teeth 21 are closely spaced, the lack of rows of plants is of little or no consequence.

Although it may be possible that the teeth 21 could be fixed radially of the reel 12, such placement would require the reel be held high enough off the ground to avoid contact between those teeth and the surface over which the combine was moving. Failure to do that would result either in breakage of teeth or their supports or in the use of considerable excess power needed to rake the surface. Also, the raising of stalks by radial teeth is less efficient than by a tooth which tends to slide nearly parallel to the surface of the ground. The sliding action tends to slide the finger under the stalks before raising it.

Because of those efficiency considerations, the preferred embodiment of the reel includes a cam control of the position of the teeth. That mechanism is shown best in FIGS. 7–10. As shown there, the shafts 17 are journalled on the ends of the lobes 16 of the former 15. At one end of each shaft 17 a crank device consisting of an arm 30 and a follower 31 perpendicular to that arm is fixed to the shaft and is thus able to control the position of the shaft 17.

In turn, the position of the arms 30 and follower 31 is controlled by a flat cam 33 fixed to the end plate 13. The cam 33 is formed so that the fingers 21 are substantially parallel to the ground at the bottom of their travel, and then hold that position for about one-fourth turn so that each group of fingers will be effective to strip the ears from the stalk as the reel 12, carries the teeth upward. For the next quarter turn of the reel 12, the fingers 21 are moved to push or throw the ear toward the covers 18 so that the ears can be carried in a trough like formation between the cover 18 and the teeth 21.

As the reel reaches about half a rotation from the time that the teeth 21 were at the lowest point, the ears will drop onto the cover 18 and may then slide off that cover and off the reel into a trough 35 in which the auger 11 runs (FIG. 3). The position of the teeth at that position is maintained into the fourth quarter of rotation, where the cam again moves the teeth 21 to the position parallel to the ground at the lowest part of the rotation of the reel.

Figure 9:
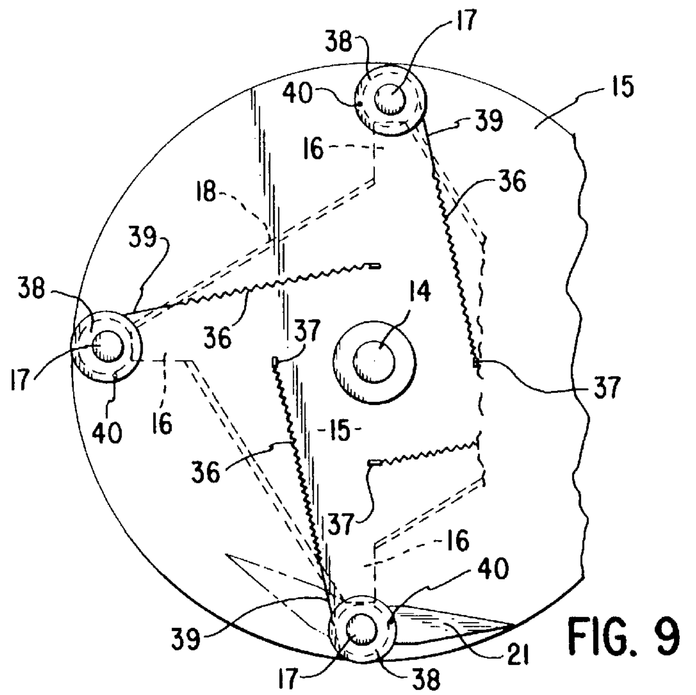
FIG. 9 is a detailed end view of the end of the rotor opposite to that shown in FIG. 7, this view shows the spring arrangement to hold the cam followers against the cam shown in FIG. 7.
Figure 10:
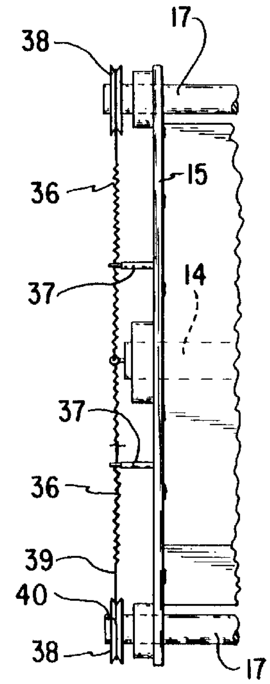
FIG. 10 is a detailed front view of the portion of the rotor shown in FIG. 9.
Figure 8:
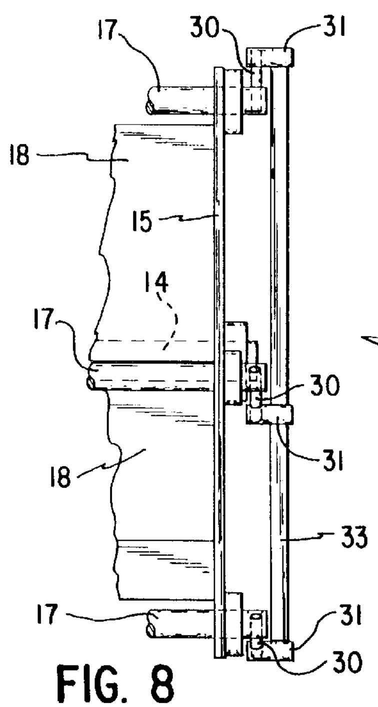
FIG. 8 is a partial front plan view of the cam end of the rotor.
Figure 7:
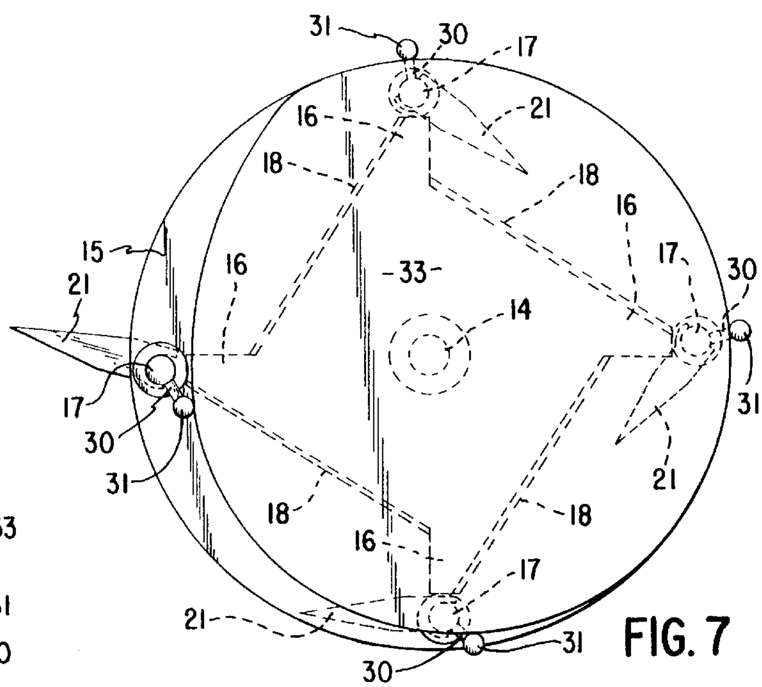
FIG. 7 is a detailed end view of the rotor of the harvester attachment showing the cam control for the fingers.

In order to keep the followers 31 on contact with the surface to the cam 33, the shafts 17 are biassed by springs 36 at the end of the shaft 17 opposite to the cam 33, (FIGS. 9 and 10). The springs are anchored to the former 15 by posts 37 fixed to the former. The springs 36 then extend toward a sheave 38 attached to the end of each shaft 17. At the end of the spring adjacent the sheave 38 is a flexible end 39, which may be a cord or cable. This end 39 is attached to the spring and is wrapped around and is fixed to the sheave 38 at an attaching point 40. Because the springs 36 are under tension, the sheaves tend to unwind, thus biassing the shaft 17 in a direction to press the followers 31 against the cam 33.

As a safety measure, the arms 30 are made of a frangible material to act as a shear pin. Thus if the points of a finger 21 or group of fingers should catch on a rock or on the ground, the arm 30 on that shaft would break. Upon breakage, the shaft 17 would be free to rotate, and the spring 36 would pull the shaft to a position in which the fingers 21 would by turned about 180 degrees as shown by the dashed line finger at the bottom location in FIG. 9. Because the reel rotates counter clockwise in that figure, it is readily apparent that the finger 21 now trails the rotation and will not be broken nor will the contact between the teeth 21 and the ground stop the rotation of the reel. It may also be quite apparent to the operator of the machine.

In operation, after the attachment is mounted on the motive unit of the combine and the engine is running, the rotation of the reel is started either by engagement of the drive chains or belts or the starting of the auxiliary motor. That rotation should by upward at the forward part of the reel. Thus, the fingers 21 will be moving upward. As the combine moves forward, the fingers 21 will pick up and separate the corn so that only one or possibly two stalks will be located between any pair of adjacent fingers. As the fingers move upward further, any ears on the stalks will be stripped off and carried upward. Further movement will cause the ears to slide onto the sheets 18 and then as the reel turns further will slide into the trough 35 to be carried by the auger 11 into the working part of the combine where the husks will be removed and the corn shelled from the cobs, Because the teeth are spaced only the width of the couple of diameters of the corn stalks, it is apparent that the spacing between the stalks is of little or no concern. Thus random planting is not a hindrance to the operation of this type of equipment.

Various features are also of note. The safety feature of the shear pin arm 30 on the cam has already been described. The teeth 21 are preferably mounted on plates 20 carrying a limited number of teeth so that if replacement is necessary, only a single plate needs to be removed and replaced. The arms 25 carrying the shoes 26 and adapted to raise lodged stalks are flexible and can be bent back—see the dashed line figure in FIG. 3.—without breaking so that normal replacement of these arms 25 will not be required. But if replacement should be necessary, that operation is simple because of their ready attachment described before.

It is thus apparent that the attachment described makes feasible the harvesting of random planted corn with the benefits such planting provides to the land.

I claim as my invention:

1. A corn harvesting attachment for use with a farm crop harvesting combine having a motive unit driven by a power source and an auger delivery unit running in a trough on said combine, said attachment being attachable to said combine and comprising end plates attachable to said combine, a reel rotatably mounted on said end plates, said reel being driven from said power source to rotate in a direction such that the bottom of said reel moves forwardly of said combine closely spaced fingers on said reel adapted to strip corn ears from corn stalks for harvesting, said fingers being carried by said reel and extending from the bottom of said reel in a direction forwardly of said combine, said fingers being adapted to drop said ears into said trough for delivery by said auger to said combine.

2. The attachment of claim 1 in which said reel is mounted on a driven shaft, a plurality of finger-carrying shafts on said reel parallel to said driven shaft, said fingers being mounted in parallel relationship on each of said finger-carrying shafts.

3. The attachment of claim 2 in which said reel includes formers having lobes on which said finger-carrying shafts are pivotally mounted.

4. The attachment of claim 1 in which the spacing between said closely spaced fingers is between 1 inch and 2½ inches.

5. The attachment of claim 3 in which said fingers are formed on plates, each of said plates having not more than one-fourth of the total number of fingers on each finger-carrying shaft.

6. The attachment of claim 3 in which the position of said fingers relative to each reel is controlled by means engaging each of said finger-carrying shafts for controlling the rotational position of said finger-carrying shafts.

7. The attachment of claim 6 in which said means for controlling the position of said finger-carrying shafts includes a cam fixed to at least one of said end plates and a follower attached to each of said finger-carrying shafts.

8. The attachment of claim 7 in which biassing means for urging said followers into contact with said cam is engaged between each of said finger-carrying shafts and one of said formers.

9. The attachment of claim 7 in which said follower is connected to its said finger-carrying shaft by a frangible link, said link being arranged to be broken if said fingers engage any barrier with enough force to endanger said finger or said finger-carrying shaft.

10. The attachment of claim 3 in which cover sheets are engaged between said formers, said cover sheets forming with said fingers a partially enclosed space adapted to carry ears of corn partly around the rotational travel of said reel.

11. The attachment of claim 6 in which cover sheets are engaged between said formers, said cam being formed to position said fingers substantially parallel to the ground at their lowest position on said reel and to move said fingers to form a partially enclosed space as said fingers are moved upward from said lowest position.

12. The attachment of claim 3 in which means for raising downed corn stalks are fastened to at least some of said fingers, said means for raising the stalks extending below said fingers.

13. The attachment of claim 12 in which each said means for raising stalks includes a flexible arm having one end fastened to one of said fingers and in which a second end carries a shoe, said shoe adapted to contact the ground and to reach under a downed stalk to raise it.

* * * * *